(12) United States Patent
Pererva et al.

(10) Patent No.: US 12,441,642 B2
(45) Date of Patent: Oct. 14, 2025

(54) GAS-LIQUID-SOLID SEPARATOR

(71) Applicants: Yehor Pererva, Logan, UT (US);
Ronald C. Sims, Logan, UT (US)

(72) Inventors: Yehor Pererva, Logan, UT (US);
Ronald C. Sims, Logan, UT (US)

(73) Assignee: Utah State University, Logan, UT (US)

(*) Notice: Subject to any disclaimer, the term of this patent is extended or adjusted under 35 U.S.C. 154(b) by 567 days.

(21) Appl. No.: 17/841,076

(22) Filed: Jun. 15, 2022

(65) Prior Publication Data

US 2022/0396510 A1 Dec. 15, 2022

Related U.S. Application Data

(60) Provisional application No. 63/210,910, filed on Jun. 15, 2021.

(51) Int. Cl.
*C02F 3/28* (2023.01)

(52) U.S. Cl.
CPC .......... *C02F 3/2846* (2013.01); *C02F 3/2866* (2013.01); *C02F 2301/04* (2013.01)

(58) Field of Classification Search
CPC .... B01D 21/265; C02F 3/2846; C02F 3/2866; C02F 2301/04
USPC ........................................ 210/188, 522, 521
See application file for complete search history.

(56) References Cited

U.S. PATENT DOCUMENTS 5,840,198 A 11/1998 Clarke

FOREIGN PATENT DOCUMENTS

| CN | 201810973177.8 A | 12/2018 |
| FR | 2293402 B1 | 7/1976 |
| GB | 2531804 B | 5/2016 |
| WO | 2015/041676 A1 | 3/2015 |

OTHER PUBLICATIONS

Deng, CN 109045769 A, English machine translation, pp. 1-4 (Year: 2018).*
Pereva et al., Approaches in Design of Laboratory-Scale UASB Reactors, Processes, Jun. 24, 2020, 8, 734.

* cited by examiner

*Primary Examiner* — Claire A Norris
(74) *Attorney, Agent, or Firm* — Thorpe North & Western, LLP

(57) ABSTRACT

A gas-liquid-solid separator can include a separator body having a vertical outer wall and a gas collector having a vertical gas collector wall surrounded by the outer wall, with a gas inlet opening at a bottom of the gas collector. An annular volume between the gas collector wall and the outer wall can contain a plurality of inclined flow channels. The flow channels can have a channel inlet opening at the bottom and can slope upward following a helical path between the gas collector wall and the outer wall. A gas-liquid-solid mixture inlet opening can be in a floor of the separator body. The mixture opening can be positioned below the gas inlet opening and the mixture inlet opening can have a top-down profile that fits within a top-down profile of the gas inlet opening.

30 Claims, 7 Drawing Sheets

GAS-LIQUID-SOLID SEPARATOR

RELATED APPLICATION

This application claims priority to U.S. Provisional Application No. 63/210,910, which was filed on Jun. 15, 2021, and which is hereby incorporated herein by reference.

FIELD OF THE INVENTION

The present technology relates to separations, and in particular to separations involved in wastewater treatment and biogas production.

BACKGROUND

Up-flow anaerobic sludge blanket (UASB) reactors are a type of anaerobic digester that can be used for wastewater treatment. These reactors often include a reaction chamber in which a blanket of granular sludge is suspended. The sludge granules contain consortia of anaerobic microorganisms that break down contaminants in wastewater. Wastewater flows upward though the sludge blanket, allowing the microorganisms to process the contaminants. Biogas is a byproduct produced by this process. Biogas can contain a high concentration of methane, which can be captured as a valuable energy source. Various types of wastewater contaminants may be processed at different rates in the reactor. For example, simple sugars dissolved in the wastewater can be digested quickly by the microorganisms, while undissolved solid contaminants can take a longer time to be broken down.

SUMMARY

The present disclosure describes gas-liquid-solid separators, up-flow reactors, and methods of separating gas, liquid, and solids. In some examples, the separators described herein can be used to separate gases, liquids, and solids from an up-flow anaerobic sludge blanket reactor. However, the separators may also be useful in other applications that involve separation of gases, liquids, and solids. The separation devices can be incorporated and utilized regardless the origin of the multi-phase mixture, either as a byproduct of reaction or excess reactants needed for further reuse.

In one example, a gas-liquid-solid separator can include a separator body having a vertical outer wall. The separator can also include a gas collector having a vertical gas collector wall surrounded by the outer wall. The gas collector can also include a gas inlet opening at a bottom of the gas collector. An annular volume can be between the gas collector wall and the outer wall. A plurality of inclined flow channels can be within the annular volume. The individual flow channels can have a channel inlet opening at a bottom of the individual flow channels, and the individual flow channels can slope upward following a helical path between the gas collector wall and the outer wall. The separator can have a gas-liquid-solid mixture inlet opening in a floor of the separator body. The mixture inlet opening can be in fluid communication with the gas inlet opening of the gas collector and the channel inlets of the inclined flow channels, and the mixture inlet opening can be positioned below the gas inlet opening. The mixture inlet opening can have a top-down profile that fits within a top-down profile of the gas inlet opening.

In some examples, the vertical outer wall and the gas collector wall can be cylindrical. In certain examples, the vertical outer wall and the gas collector wall are coaxial. The ratio of the gas collector wall outer diameter to the outer wall inner diameter can be from about 0.5 to about 0.95 in some examples.

In other examples, the gas inlet opening and the mixture inlet opening can be circular. In certain examples, the gas inlet opening and the mixture inlet opening can be concentric.

In one example, the gas collector can include a bushing having flared bottom portion that widens from the gas collector wall toward the gas inlet opening. Therefore, the gas inlet opening can have a larger diameter than the gas collector wall. In certain examples, the flared bottom portion can include an inclined inner surface sloping upward toward a central axis of the gas collector at an angle from about 30° to about 60° from vertical. In further examples, a ratio of the gas collector wall inner diameter to the gas inlet opening diameter can be from about 0.5 to about 0.95. In still further examples, a ratio of the gas inlet opening diameter to a mixture inlet diameter can be from about 1.25 to about 2.0. In other examples, a ratio of the gas inlet opening diameter to an outer wall inner diameter can be from about 0.8 to about 0.95.

The inclined flow channels can have a cross-section shape including, but not limited to, quadrilaterals such as a square, a rectangle, polygons such as a triangle, a hexagon, and curved shapes such as a circle, and an oval in some examples, or combination of those. In certain examples, the inclined flow channels can be formed as a plurality of helical-shaped plates extending from the gas collector wall to the outer wall. For example, the corkscrew-shaped plates can be formed as a rectangle cross-section extending from the gas collector wall to the outer wall, wherein the rectangle cross-section is extruded along a helical extrusion path around the gas collector wall. In certain examples, the corkscrew-shaped plates can be separated vertically at a pitch distance more than 50 mm, although spacing can be varied based on scale. In other examples, the inclined flow channels can be inclined at an angle from about 35° to about 70° from horizontal when the angle is measured at the outer wall. In another option, the angle can be varied along a width of the inclined flow channels. Additional optional configurations can include S-shaped channels, segmented channels and the like. For example, inclined flow channels can include interruptions or breaks along the helical path. Similarly, such segmented inclined flow channels can be offset to allow flow between adjacent channels although care can be taken to avoid settling and clogging in such configurations.

The base of the separator body can slope upward from the mixture inlet opening to the outer wall, in some examples. The slope of the base can be from about 35° to about 70° from horizontal. In some examples, a vertical clearance between the base and the gas collector at the gas inlet opening can ensure a free flow of liquid into the separator and minimal or lower hydraulic resistance to settling solids. In further examples, the separator can also include a bottom surface sloping downward out from the mixture inlet opening. In certain examples, the bottom surface can slope downward at an angle from about 35° to about 70° from horizontal. A horizontal bottom surface can be useful for flange connections are when adding to an existing reactor as a separate chamber. Alternatively, an angled bottom surface can be useful when the separator is introduced into an existing reactor or separator chamber as an insert.

The separator can also include a clarified liquid (i.e. effluent) chamber in the annular volume above the plurality of inclined flow channels. The individual flow channels can have a channel outlet opening at a top of the individual flow channels to outlet into the clarified liquid chamber to form one or more common fluid volumes within the clarified liquid chamber. The separator can also include an effluent outlet from the clarified liquid chamber to allow withdrawal of clarified liquids.

In some examples, the separator can be formed as a drop-in insert for an up-flow anaerobic sludge blanket reactor. In other examples, the separator can be an integrated part of an up-flow anaerobic sludge blanket reactor. In another example, the separator can be formed as a separate unit used as in situ replacement of existing separation units above the main reaction chamber.

The present disclosure also describes up-flow reactors. In one example, an up-flow reactor includes a reaction chamber in a lower portion of the reactor and a gas-liquid-solid separator positioned above the reaction chamber. The separator can include a separator body having a vertical outer wall and a gas collector having a vertical gas collector wall surrounded by the outer wall. In some cases the vertical outer wall can be cylindrical. The gas collector can also include a gas inlet opening at a bottom of the gas collector. An annular volume is between the gas collector wall and the outer wall. A plurality of inclined flow channels can be within the annular volume. The individual flow channels can have a channel inlet opening at a bottom of the each of individual flow channels. The individual flow channels can slope upward following a helical path between the gas collector wall and the outer wall. The separator can also include a gas-liquid-solid mixture inlet opening in a floor of the separator body to allow a gas-liquid-solid mixture to flow from the reaction chamber into the separator. The mixture inlet opening can be in fluid communication with the gas inlet opening of the gas collector and the channel inlets of the inclined flow channels. The mixture inlet opening can be positioned below the gas inlet opening and the mixture inlet opening can have a top-down profile that fits within a top-down profile of the gas inlet opening. In various examples, the separator can have any of the features and components described above.

The present disclosure also describes methods of separating gas, liquid, and solids. In one example, a method of separating gas, liquids, and solids can include feeding a mixture of gas, liquid, and solids into a separator through a gas-liquid-solid mixture inlet opening of a separator. The separator can include a separator body having a vertical outer wall and a gas collector having a vertical gas collector wall surrounded by the outer wall. The gas collector can also include a gas inlet opening at a bottom of the gas collector. An annular volume can be between the gas collector wall and the outer wall. A plurality of inclined flow channels can be within the annular volume. The individual flow channels can have a channel inlet opening at a bottom of the individual flow channels, and the individual flow channels can slope upward following a helical path between the gas collector wall and the outer wall. The separator can also include a gas-liquid-solid mixture inlet opening in a floor of the separator body. The mixture inlet opening can be in fluid communication with the gas inlet opening of the gas collector and the channel inlets of the inclined flow channels. The mixture inlet opening can be positioned below the gas inlet opening, and the mixture inlet opening can have a top-down profile that fits within a top-down profile of the gas inlet opening. The method can also include collecting gas from the gas collector, and flowing a mixture of liquid and solids up through the plurality of inclined flow channels. At least a portion of the solids can settle out of the liquid and fall back downward through the inclined flow channels. The clarified liquid with reduced solids can be collected from an outlet at the top of the inclined flow channels.

In some examples, the mixture of gas, liquids, and solids can include water, biogas, and sludge particles that include anaerobic bacteria. In certain examples, the clarified liquid can be devoid of gas or can include gas in an amount which is less than 50% of an incoming gas content by volume. In various other examples, the separator can have any of the features and components described above.

Additional features and advantages of these principles will be apparent from the following detailed description, which illustrates, by way of example, features of the invention.

Figure 1:
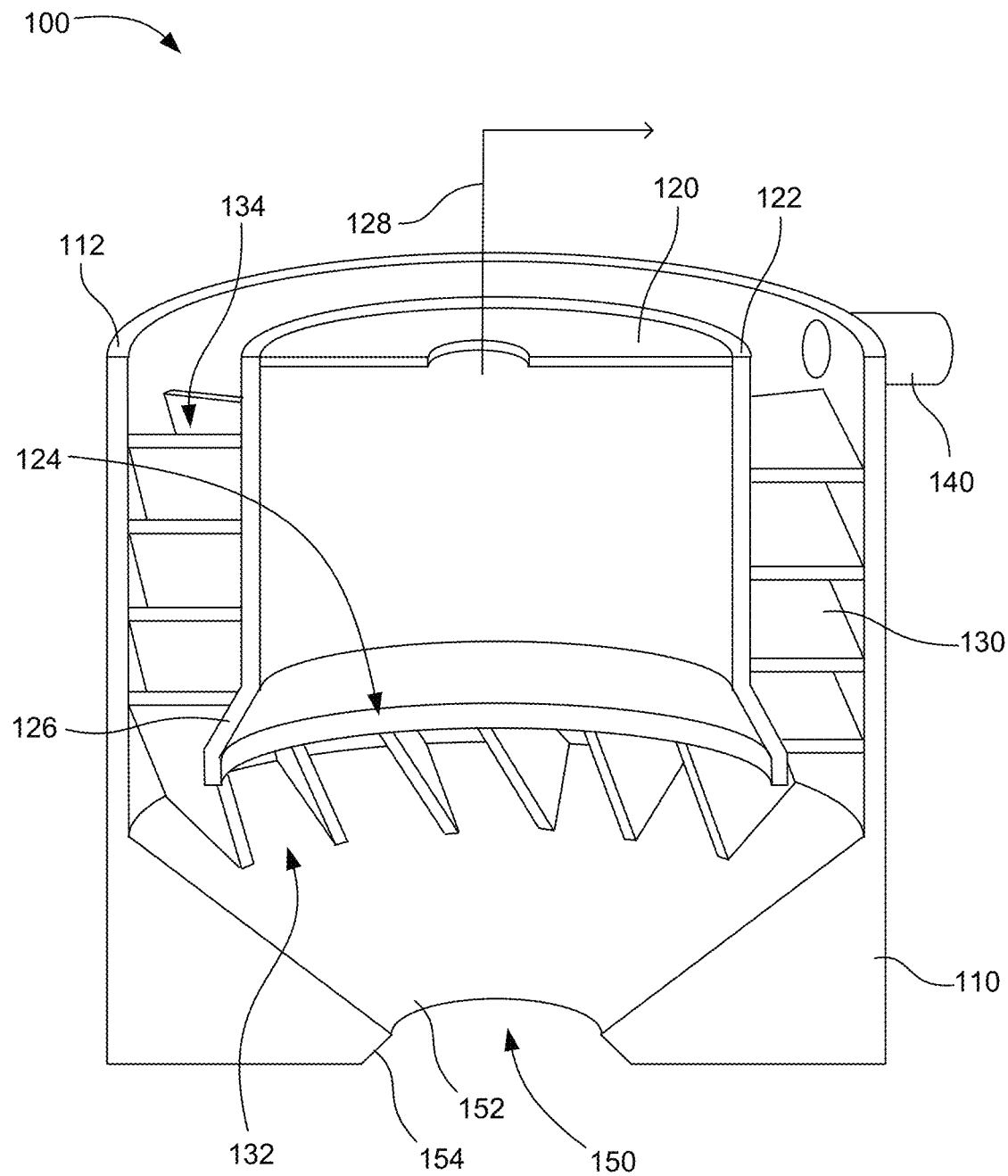
FIG. 1 is a cutaway view of an example gas-liquid-solid separator in accordance with the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a channel" includes reference to one or more of such structures, "a solid" includes reference to one or more of such materials, and "flowing" refers to one or more of such steps.

As used herein, "substantial" when used in reference to a quantity or amount of a material, or a specific characteristic or property thereof, refers to an amount or property value that is sufficient to provide an effect that the material or property was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property. The term "about" is not intended to either expand or limit the degree of equivalents which may otherwise be afforded a particular value. Further, unless otherwise stated, the term "about" shall expressly include "exactly," consistent with the discussion below regarding ranges and numerical data. However, unless otherwise enunciated, the term "about" generally connotes flexibility of less than 5%, most often less than 1%, and in some cases less than 0.01%.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Gas-Liquid-Solid Separators

As mentioned above, the present disclosure describes separators that can be used to separate gases, liquids, and solids. In some cases, a separator can be used with an up-flow anaerobic sludge blanket (UASB) reactor. In these examples, wastewater can be treated in the UASB reactor. A blanket of sludge granules can be suspended in the reactor. These granules can include live and active biomass including anaerobic microorganisms that decompose contaminants in the wastewater. Other solids that may be present can include inert material, which may help with granulation of the biomass, and undissolved organic material, which can be broken down over time and decomposed by the biomass. The microorganisms can decompose organic compounds in the wastewater and produce biogas. The biogas can contain a high concentration of methane, which can be recovered and used as an energy source. Thus, the biomass performs the useful functions of cleaning the wastewater while simultaneously producing a valuable energy source. Accordingly, it is useful to preserve an appropriate amount of biomass in the UASB reactor.

When a UASB reactor is in operation, a significant portion of the biomass present in the reactor can be suspended as a sludge blanket. The flow rate of wastewater through the reactor can be adjusted so that the up-flow of water roughly matches the settling force of gravity to keep the sludge blanket suspended within the reactor. In some cases, flocculants can also be added to help form granules that make up the sludge blanket. However, it can be difficult to prevent a portion of the biomass from being carried out of the reactor with the flow of water. Smaller and less dense granules are more prone to be carried out of the reactor even when the flow of water is relatively slow. A variety of other solid particles, such as undissolved solid contaminants, can also be carried in the water flow. These solids can often be suspended in the water effluent and carried out of the reactor, which is referred to as washout of the suspended solids. This can be undesirable for multiple reasons. First, the water effluent is dirtier with the suspended solids present. Additionally, any biomass that washes out from the reactor is no longer available to participate in the process of anaerobic digestion of contaminants and production of biogas in the reactor. When washout of biomass occurs consistently, it can be more difficult to form the sludge blanket in the reactor. In case washout occurs during the operational start-up of reactor, this phenomenon postpones the occurrence of steady-state operation period, potentially leading to a delays in operation and associated expenses. It would also be desirable to maintain any solid contaminant particles inside the reactor for a longer time period so that the solid contaminants can be broken down and decomposed by the biomass.

The separators described herein can help to prevent washout of solids. At the same time, the separators can be used to collect biogas produced in the UASB reactor, separating the biogas from the water and solids. Thus, the separators can simultaneously separate gases, liquids, and solids from a mixture that includes all three phases. Although many examples are described herein that involve using the separators with UASB reactors, the separators described herein can also be used in other applications where gases, liquids, and solids are to be separated.

FIG. 1 shows a partial cross-sectional view of one example gas-liquid-solid separator 100 as described herein. The separator includes a separator body 110 with a vertical outer wall 112. In this example, the separator outer wall is shaped as a cylinder. A gas collector 120 is in the center of the cylinder. The gas collector includes a vertical gas collector wall 122, which is also shaped as a cylinder. In this example, the gas collector wall is concentric with the outer wall. The gas collector has a gas inlet opening 124 at the bottom. In this example, the gas collector includes a flared portion 126 at the bottom, so that the gas inlet opening has a larger diameter than the gas collector wall above. Gas can flow out of the gas collector as a gas outlet stream 128. An annular volume is between the gas collector wall and the outer wall. A plurality of inclined flow channels 130 is formed in this annular volume. In this example, the inclined flow channels follow a curved path that has a helical, or corkscrew, shape. The inclined flow channels have inlets 132 at the bottom and outlets 134 at the top. Liquid can flow upward through these flow channels, following the helical sloped pathway. The liquid can then flow out of the separator through an effluent outlet 140. At the bottom of the separator, a gas-liquid-solid mixture inlet opening 150 is formed in the floor of the separator body. In this example, the mixture inlet opening is a circular hole at the bottom of the separator. The mixture inlet opening is positioned directly under the gas collector. The mixture inlet opening also has a diameter that is less than the diameter of the gas inlet opening of the gas collector. Therefore, if viewed from above, the mixture inlet opening has a top-down profile that fits within the top-down profile of the gas inlet opening. An angled floor 152 extends from the gas-liquid-solid mixture inlet opening up to the inlets of the inclined flow channels. The separator body can also have an angled bottom surface 154 extending downward from the gas-liquid-solid mixture inlet opening.

The separator design shown in FIG. 1 can be particularly useful for collecting gas and liquid while retaining solids. In particular, the separator can be connected to a reactor or other source of a mixture that includes gas, liquid, and solids. As explained above, one example can include orienting the separator within a UASB reactor. The mixture of gas, liquid, and solids can enter the separator from the bottom through the mixture inlet opening. Gas in the mixture can be in the form of distributed gas bubbles. Because the mixture inlet opening is constricted, the gas bubbles are concentrated in a center portion of the separator. The gas bubbles can rise, due to their buoyancy, and then the gas bubbles can be captured by the gas collector. In the example shown in FIG. 1, the gas collector includes a flared portion at the bottom, making the gas inlet opening significantly larger in diameter compared to the mixture inlet opening. In some cases, the gas inlet opening can be from 30% to 200% larger than the mixture inlet opening. The gas inlet opening can capture all or nearly all of the gas bubbles, even if the gas bubbles spread out slightly as they rise through the liquid in the separator.

Figure 2:
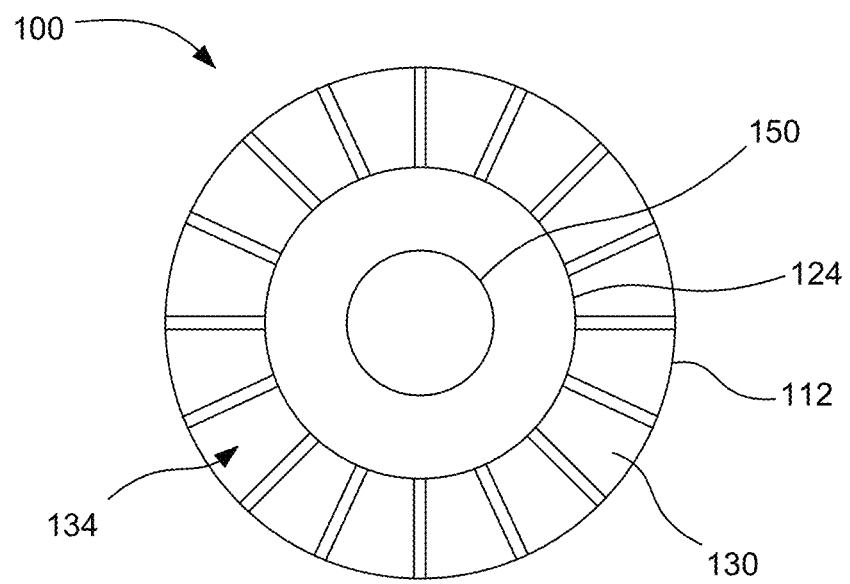
FIG. 2 is a top-down view of the profile of a gas-liquid-solid mixture inlet opening and a gas inlet opening of a separator in accordance with the present disclosure.

FIG. 2 shows a schematic top-down view of the separator 100 that includes the top-down profile of the gas-liquid-solid mixture inlet opening 150 and the top-down profile of the gas inlet opening 134. This figure shows how the mixture inlet opening is a circular opening having a smaller diameter than the gas inlet opening. Additionally, the openings are concentric in this example. When gas bubbles enter the separator through the mixture inlet opening, the gas bubbles can rise and then be captured by the gas inlet opening because the gas inlet opening has a sufficiently larger diameter. Although this example includes concentric circular openings for the mixture inlet opening and the gas inlet opening, in other examples these openings can have other shapes and other arrangements. For example, one or both of the openings can have a non-circular shape. However, in some examples, the top-down profile of the mixture inlet opening can fit within the top-down profile of the gas inlet opening, when viewed from above, even if the shapes are different. When the mixture inlet opening is aligned with the gas inlet opening in this way, the gas inlet opening can effectively capture gas bubbles that enter the separator through the mixture inlet opening. FIG. 2 also shows a cross section of the inclined flow channels 130 between the gas inlet opening and the vertical outer wall 112.

Figure 3:
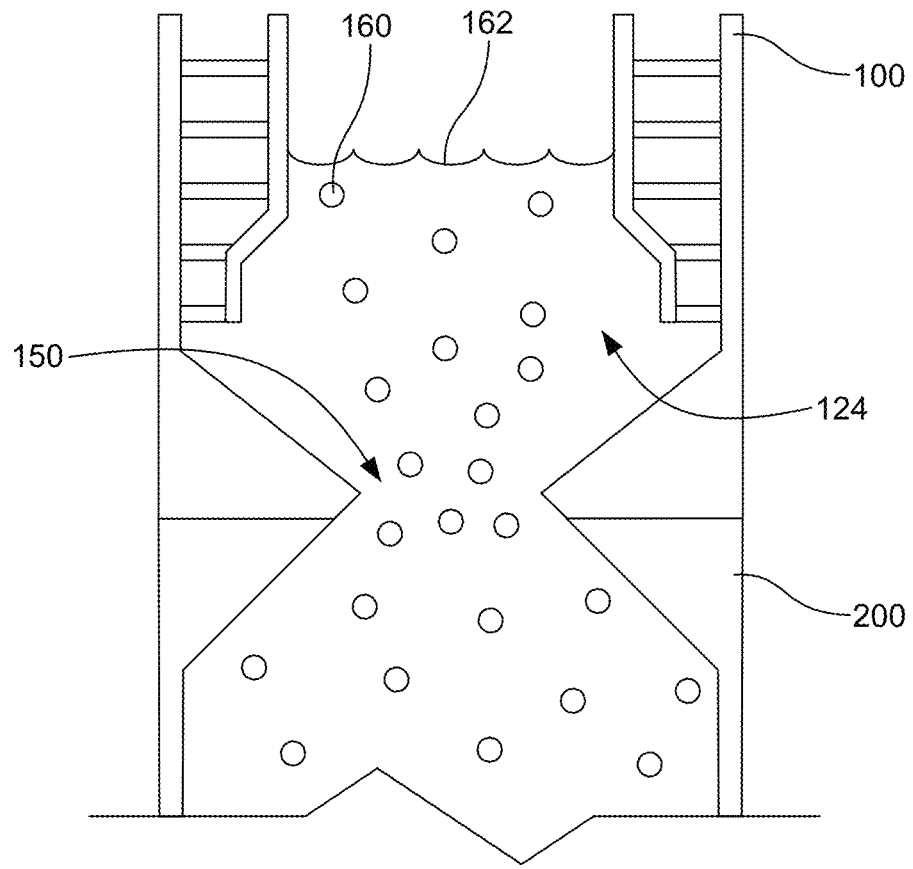
FIG. 3 is a cross-sectional view of another example separator in accordance with the present disclosure.

FIG. 3 shows a side cross-sectional view of another example separator 100. This figure illustrates how gas bubbles 160 can enter the separator through the mixture inlet opening 150. In this figure, the separator is placed on top of a reactor 200. Gas bubbles are formed in the reactor, such as by biomass decomposing wastewater contaminants and producing biogas. The gas bubbles pass through the constricted mixture inlet opening. The gas bubbles then rise upward into the gas collector 120. The gas inlet opening 124 of the gas collector has a larger diameter than the mixture inlet opening, so all of the gas bubbles are captured even though the gas bubbles spread out somewhat when they rise through the liquid. This figure shows the liquid level 162 part way up inside the gas collector. The level of liquid can depend on the pressure of the gas above the liquid inside the gas collector. The upper volume in the gas collector can generally be connected to additional equipment for storing or utilizing the gas. For example, the gas collector can be connected to a compressor and storage tanks for storing the gas. Alternatively, the gas can be used as it is produced, such as burning produced biogas to generate energy to be used on-site in running a wastewater treatment process.

It is noted that in some examples, such as the examples shown in the figures, the gas collector can include a flared portion at the bottom, with a shape similar to an upside-down funnel. However, in other examples, the gas collector may not include a flared portion. In certain examples, the gas collector can have all vertical walls with a constant cross-section from top to bottom, such as a simple cylinder that does not flare at the bottom.

Certain dimensions and properties of the gas collector can influence its effectiveness for capturing gas. For example, the relative diameter of the gas inlet opening and the gas-liquid-solid mixture inlet opening can affect the amount of gas that is captured. The gas inlet opening have a diameter that is greater than or equal to the mixture inlet opening. In certain examples, the ratio of the gas inlet opening diameter to the mixture inlet opening diameter can be up to 2.0. In further examples, the ratio can be from varied based on available footprint around the target UASB reactor and/or mechanical strength characteristics of the separator and reactor.

The diameter of the outer wall of the separator body can also affect the function of the separator. For example, if the gas inlet opening has a diameter close to the diameter of the outer wall, then there will be limited space between the gas collector and the outer wall. Liquid can flow through this space, but gas bubbles can be captured by the gas inlet opening instead of passing through this limited space. The larger the gas inlet opening is, the more likely it will be to capture all of the gas bubbles. However, the space between the gas inlet opening and the outer wall can be large enough that the space will not be clogged by solids.

In further examples, the ratio of the gas collector wall outer diameter to the outer wall inner diameter can be from about 0.5 to about 0.95. In certain examples, the ratio can be from about 0.6 to about 0.9 or from about 0.6 to about 0.8.

In some examples, the gas collector can include a flared bottom portion that includes an inclined inner surface sloping toward a central axis of the gas collector at an angle from about 20° to about 60° from vertical. In other examples, the angle can be from about 30° to about 45°, or from about 45° to about 60°, or from about 45° to about 50°.

In another further alternative, gas coalescent protrusions may be introduced within the gas collector portion of the separator. For example, physical barriers, rods, protrusions or other members can extend into regions where bubbles are concentrated. These protrusions can provide a substrate for smaller gas bubbles to coalesce.

The gas collectors described above can be effective for removing gas from a gas-liquid-solid mixture. However, the gas collectors may have little effect on the separation of solids from liquid in the mixture. To increase the separation of solids and liquid, the separator can also include a plurality of inclined flow channels in the annular volume between the gas collector wall and the outer wall of the separator body. These inclined flow channels can have the effect of reducing the settling path distance for solid particles settling out of the liquid. The separators described herein can be used with mixtures that include solid particles that are denser than the liquid, i.e., particles that are heavier than water mixed with wastewater. These solid particles can settle over time. However, the settling time for many of the particles can be relatively long. The settling time can be shortened by reducing the settling path distance.

In the separators described herein, the liquid-solid mixture can flow through many individual flow channels that have a relatively small internal vertical height. For example, if an inclined flow channel has an internal vertical height of 10 mm, then the maximum distance that solid particles travel to settle to the bottom of the channel is 10 mm. The liquid-solid mixture can flow through the inclined flow channels at a rate that allows most or all of the solid particles to settle out of the liquid before the liquid exits through an effluent outlet. Once solid particles have settled onto the floor of the inclined flow channel, the flowing liquid can exert much less force on the solid particles so that the solid particles are no longer pushed upward through the inclined flow channel. In fact, in some cases the force of gravity can become stronger than the force of the liquid flow, and the solid particles can fall back down along the floor of the inclined flow channel. Eventually, the solid particles can return all the way to the reactor from which the gas-liquid-solid mixture came originally.

Figure 4:
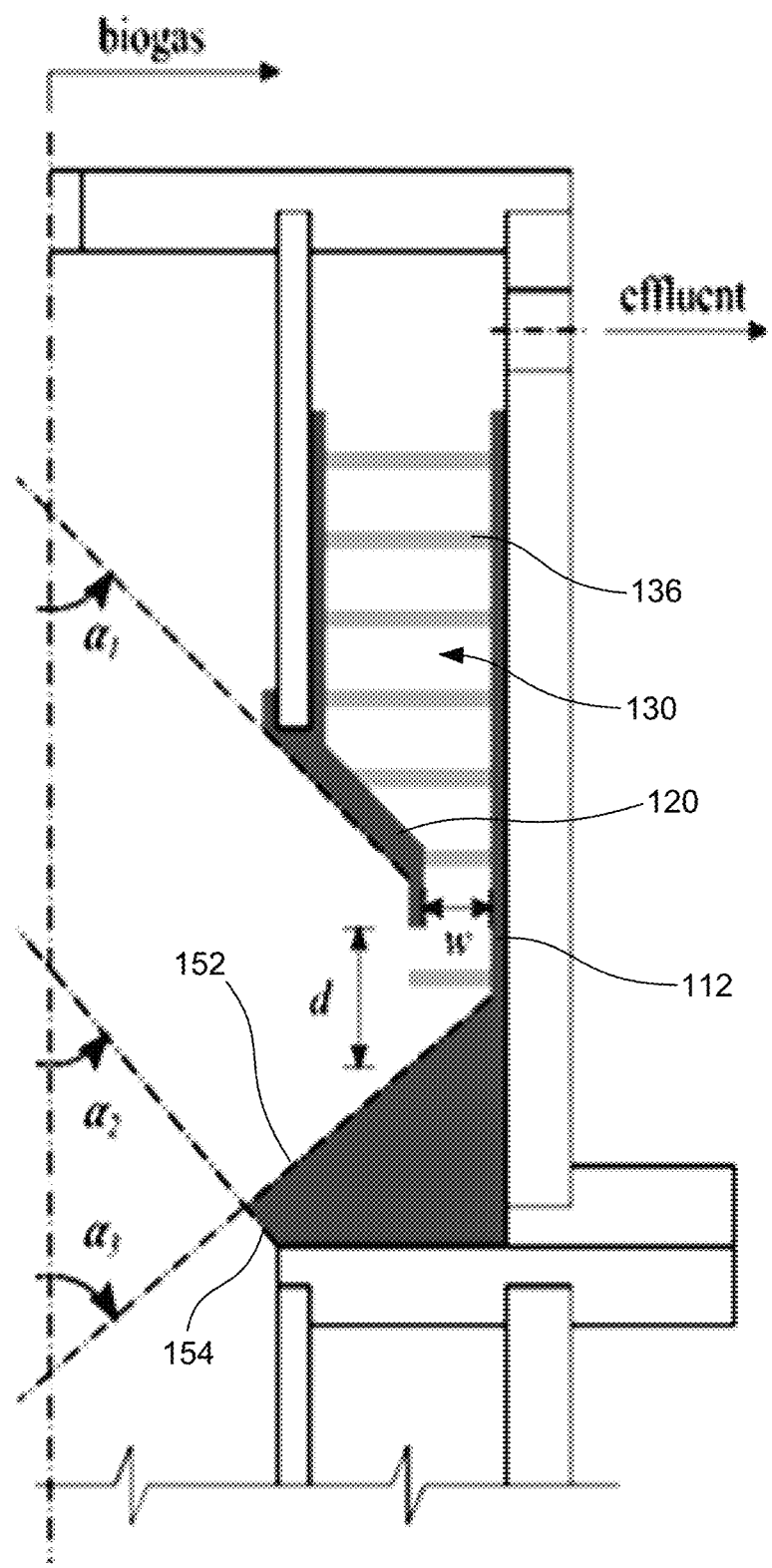
FIG. 4 is a partial cross-sectional view of another example separator in accordance with the present disclosure.
Figure 5:
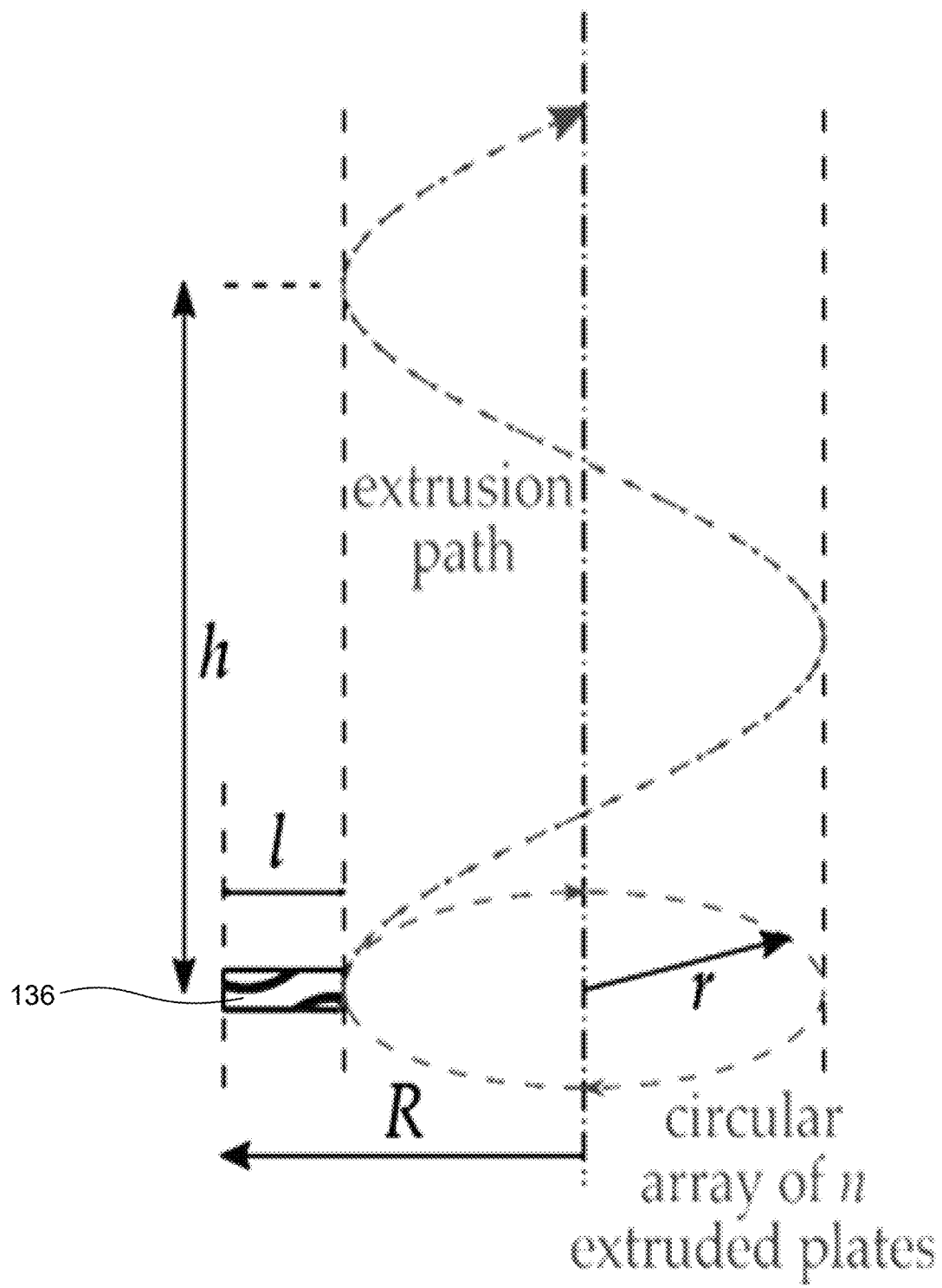
FIG. 5 is a schematic drawing of building concept for a helical extrusion path of an inclined flow channel in accordance with the present disclosure.

FIG. 4 shows a cross-sectional view of one half of an example separator. This example includes inclined flow channels 130 with a shape that can be conceptually understood as a series of rectangular elements 136 that are extruded along a helical path between the gas collector wall and the outer wall of the separator body. Thus, the extruded rectangles take the shape of corkscrew-shaped plates that spiral around the gas collector wall and connect to the outer wall. These plates act as the floors and ceilings of the inclined flow channels. The shape of the channels themselves can exhibit a square or rectangular cross-section that is extruded along the helical path between the gas collector wall and the outer wall. FIG. 5 shows this helical path in more detail. In FIG. 5, the corkscrew-shaped plates are described as have an inner radius r, an outer radius R, a plate width l (which is equal to R−r), and a pitch h. It is noted that the pitch h in FIG. 5 is the pitch of the helical extrusion pathway, or in other words, the vertical distance over which the helical pathway turns 360°. If the rectangular element 136 shown in FIG. 5 is extruded along the helical pathway, then the result will be a single corkscrew-shaped plate. Multiple of these corkscrew-shaped plates can be stacked in the annular volume between the gas collector wall and the outer wall, with the spaces between the plates being the individual inclined flow channels.

FIG. 4 also shows several dimensions of the separator. The distance w is the width of the horizontal space between the gas collector 120 and the outer wall 112. When this distance is small, it can be easier for the gas collector to capture all gas bubbles that enter through the gas-liquid-solid mixture inlet opening. However, if this distance is too small, then clogging of solids may occur in the inlets of the inclined flow channels.

The distance labelled d is the vertical clearance between the gas collector and the floor 152 of the separator body. This distance can also affect the operation of the separator similar to the distance w. If the vertical clearance d is large, then there may be more space for gas bubbles to spread out and some gas bubbles may escape through the inclined flow channels. However, if d is too small, then clogging of solids may occur if solids build up between the floor and the edge of the gas collector.

FIG. 4 also shows several angles. The angle $\alpha_1$ is the angle of the sloped surface of the gas collector. As mentioned above, the gas collector can have a flared portion with a sloped surface. In some examples, the angle of this surface can be from about 20° to about 60° from vertical. In other examples, the angle can be from about 30° to about 45°, or from about 45° to about 60°, or from about 45° to about 50°. The angle $\alpha_2$ is the angle of a sloped bottom surface 154 that extends downward and outward from the gas-liquid-solid mixture inlet opening at the bottom of the separator. In some cases, this sloped surface can be omitted, especially if the separator is used with a reactor that includes baffles already. However, in some examples, this sloped bottom surface can help concentrate gas bubbles at the center of the separator. The angle $\alpha_3$ is the slope of the floor 152 of the separator body. The floor can slope upward from the gas-liquid-solid mixture inlet opening toward the outer wall of the separator body. Thus, the floor can have funnel shape. This slope can allow solid particles that have settled out of the liquid to fall back into the reactor through the mixture inlet opening. In some examples, the slope of the floor can be from about 35° to about 70° from horizontal. In further examples, the slope of the floor can be from about 45° to about 60° or from about 45° to about 55°.

Returning to the inclined flow channels, it is noted that the incline angle of the inclined flow channels is different depending on where the incline angle is measured. For example, the incline angle measured at the inner radius r will be steeper than the incline angle measured at the outer radius R. This can be explained by considering two coaxial cylinders of height h, which can be the pitch height of the helical pathway as shown in FIG. 5. The inner cylinder in this example is the gas collector wall, and the outer cylinder is the outer wall of the separator body. If each cylinder is unfolded, the result will be two rectangles, where the diagonals of the rectangles correspond to the path of the corkscrew-shaped plate described above. The bases of the rectangles are equal to the circumferences of the cylinders. Thus, the inner cylinder (gas collector wall) will unfold to make a rectangle with a shorter base than the outer cylinder (outer wall). Accordingly, the angle of the diagonal is steeper for the inner cylinder.

Figure 6:
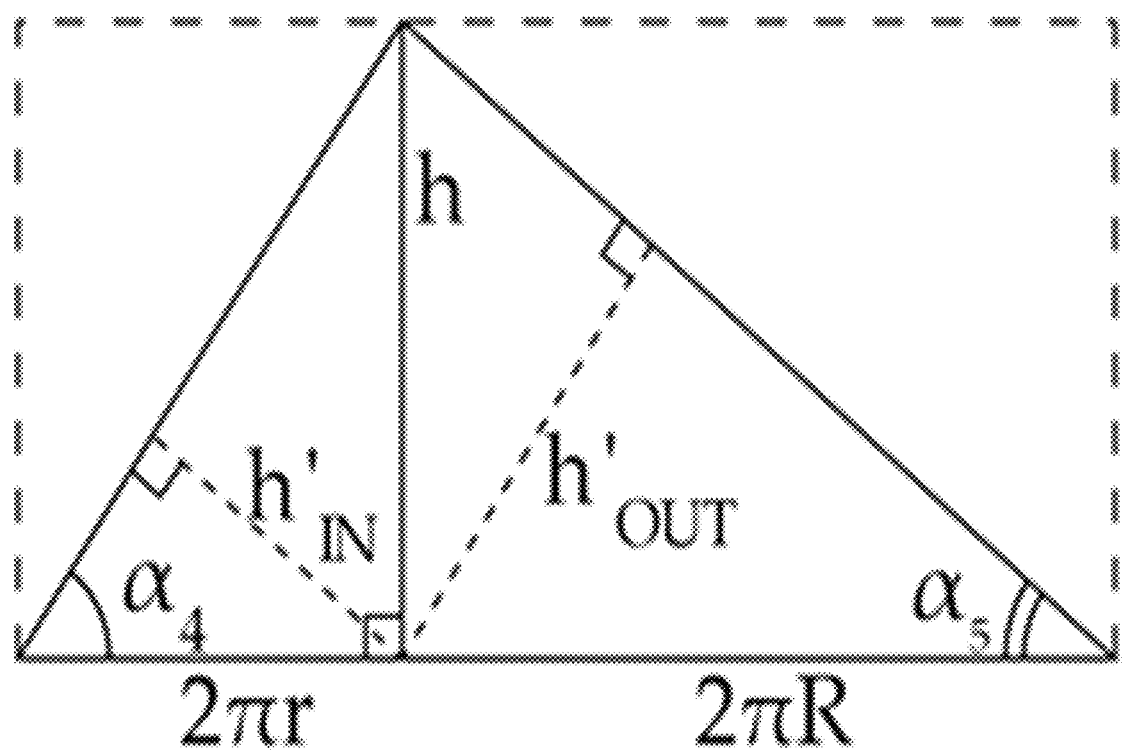
FIG. 6 is a diagram of the slope of an inclined flow channel at an inner radius and at an outer radius in accordance with the present disclosure.

FIG. 6 is a schematic drawing representing these rectangles attached together, since the rectangles share the same height h. This figure shows the incline angle of the plate as measured at the inner radius ($\alpha_4$) and the incline angle of the plate as measured at the outer radius ($\alpha_5$). The incline angle measured at the inner radius is steeper than at the outer radius. These angles can be related mathematically to the pitch h as follows:

$$2\pi R \tan\alpha_5 = h = 2\pi r \tan\alpha_4 \qquad (1)$$

-continued $$\alpha_5 = \arctan\left(\frac{r \cdot \tan\alpha_4}{R}\right) \quad (2)$$

$$\alpha_4 = \arctan\left(\frac{R \cdot \tan\alpha_5}{r}\right) \quad (3)$$

where: R is the outer radius of the corkscrew-shaped plate; r is the inner radius of the corkscrew-shaped plate; $\alpha_4$ is the incline angle of the corkscrew-shaped plate at the inner radius; and $\alpha_5$ is the incline angle of the corkscrew-shaped plate at the outer radius.

As mentioned above, multiple corkscrew-shaped plates can be stacked with spaces between the plates to form the plurality of inclined flow channels. The orthogonal spacing between the corkscrew-shaped plates also changes across the length from the inner radius to the outer radius. The orthogonal distance can be expressed by the following equations:

$$h'_{IN} = \frac{2\pi r}{n}\sin\alpha_4 = \frac{h}{n}\cos\alpha_4 \quad (4)$$

$$h'_{OUT} = \frac{2\pi R}{n}\sin\alpha_5 = \frac{h}{n}\cos\alpha_5 \quad (5)$$

where n is the number of plates in the annular volume; h is the pitch of the helical pathway; $h'_{IN}$ is the orthogonal spacing between inclined plates at the inner radius; and $h'_{OUT}$ is the orthogonal spacing between inclined plates at the outer radius.

Accordingly, the incline angle of the inclined flow channels can be different when measured at the inner radius (at the gas collector wall) than when measured at the outer radius (at the outer wall of the separator of the body). In some examples, the incline angle when measured at the outer wall can be from about 35° to about 70° from horizontal. In further examples, the angle can be from about 45° to about 60° or from about 50° to about 60°.

Figure 7:
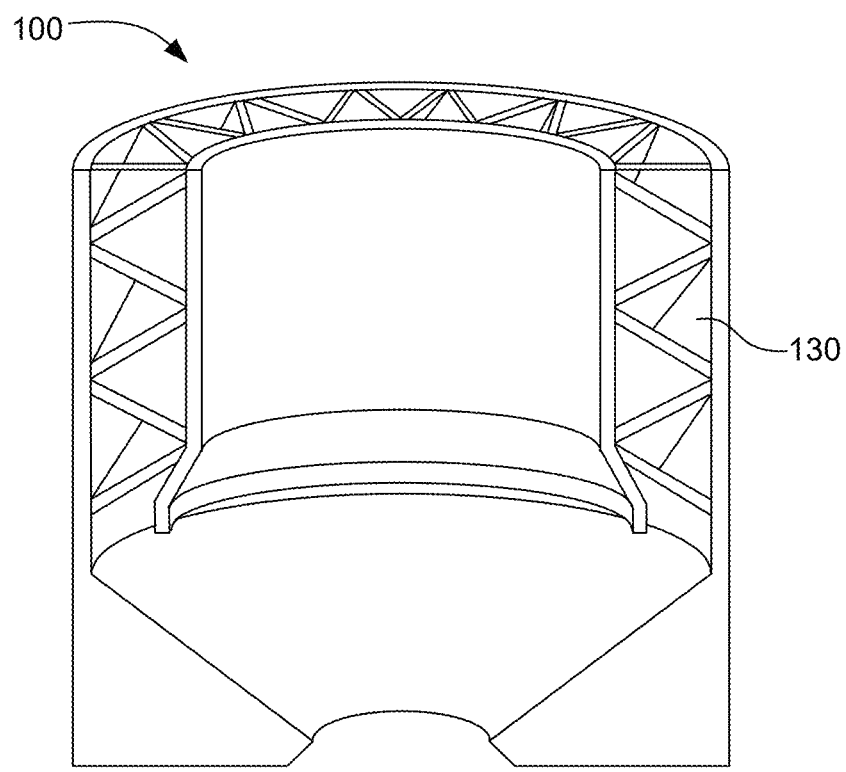
FIG. 7 is a cutaway view of another example separator in accordance with the present disclosure.
Figure 8:
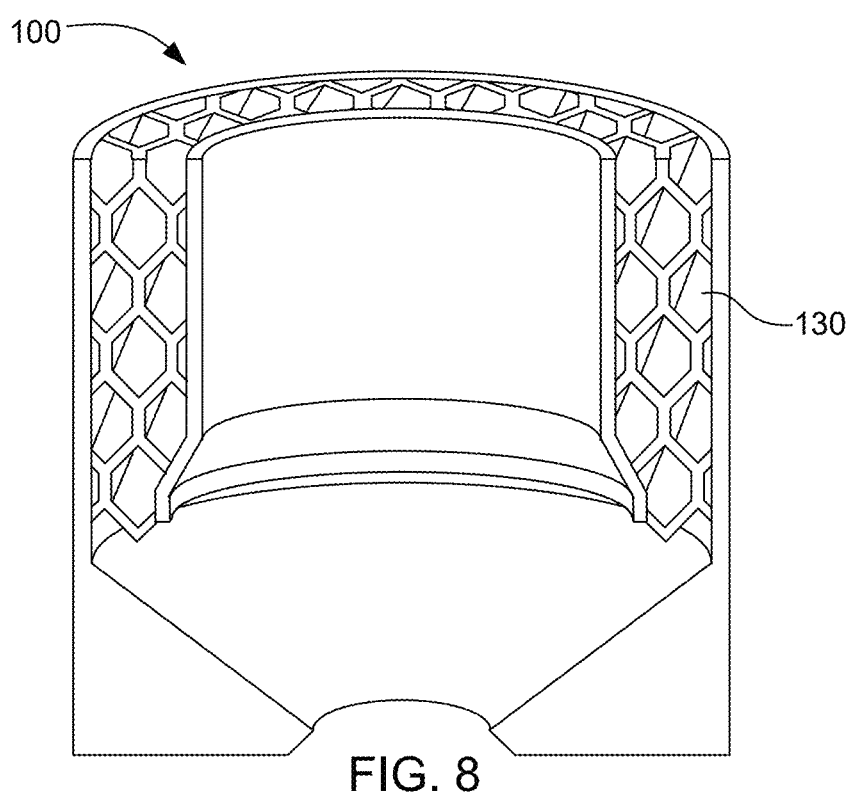
FIG. 8 is a cutaway view of yet another example separator in accordance with the present disclosure.

The inclined flow channels described above can be formed as a series of corkscrew-shaped plates stacked in the annular volume between the gas collector and the outer wall, and the flow channels can specifically be the spaces between the plates. In this example, the cross-section of the inclined flow channels can be square or rectangular. However, other inclined flow channel cross-section shapes can also be used. In various examples, the inclined flow channels can have a cross-section shape such as a quadrilateral such as a square, a rectangle, a rhombus, etc., a polygon such as a triangle, a hexagon, and a curved shape such as a circle, an oval, or others, or their combinations. With any of these cross-sectional shapes, the inclined flow channels can still follow a helical path between the outer wall and the gas collector wall. FIG. 7 shows an example separator 100 that has triangular inclined flow channels 130. FIG. 8 shows an example separator 100 that has hexagonal inclined flow channels 130. Furthermore, the inclined flow channels can be segmented to provide a plurality of flow paths. For example, multiple inclined flow channel segments can be oriented in series having a gap between adjacent segments. Alternatively, or in addition, inclined flow plates can have a predetermined length where adjacent inclined plates are offset and vertically spaced so as to orient inclined flow plates at least partially in a series arrangement having gaps along the helical flow path. In this manner, fluid can flow between adjacent inclined plates and then at termination of one plate, flow can split between offset adjacent plates at gaps. In some cases, the inclined flow plates can extend fully between the inner and outer walls of the annular space. Optionally, alternating inclined flow plates can extend from alternating inner and outer walls of the annular space.

Internal surfaces of the separators can optionally be coated with materials which reduce adhesion of bubbles and solid particulates, if such functionality is desired. For example, metal surfaces can be galvanized, polished, oxidized, and/or may include protective lacquers, while polymer surfaces a solvent treatment can increase surface smoothness. In locations where solid adhesion is desirable, a polyurethane or other adhesion coating can be applied.

The separators described herein can be manufactured from a variety of suitable materials and with any suitable fabrication method. Different materials and fabrication methods may be more or less cost-effective depending on the size of the separator. In some examples, the separator can be a relatively small, laboratory-scale separator. The dimensions of the various internal parts of the separator can be determined using the ratios and angles described above. Small scale separators can, in some examples, be fabricated using additive manufacturing. A variety of additive manufacturing processes can be used, such as fused deposition modelling, stereolithography, selective laser sintering, and others. In other examples, separators can be fabricated by machining. In some cases, the reactor insert can be manufactured as a single monolithic piece which can be inserted into a reactor housing. Alternatively, the separator and reactor insert can be made from smaller components that can be machined, molded, welded, or made using any other suitable fabrication methods. The smaller parts can then be assembled. This can allow for disassembly, cleaning and repair as needed. Some materials that can be useful for making the separator in small scale can include polymeric materials such as polylactic acid, acrylonitrile butadiene styrene, polyethylene terephthalate glycol, polypropylene, epoxy resin, and others. The separator can also be made of metals such as steel, aluminum, and so on, depending on the intended environment.

Larger-scale separators can be used in industrial processes, such as full-scale wastewater treatment processes. In some examples, larger scale separators can have an outer wall outer diameter from about 1 m to about 10 m. The height can also be from about 1 m to about 10 m. In some examples, these separators can be fabricated using methods appropriate for large scale equipment. In certain examples, the separator can be made by forming components from sheet material, such as sheet steel, and then assembling the components. The components can be assembled using welding, rivets, or other techniques. For example, the outer wall and gas collector wall can be fashioned from sheet steel cylinders or pipes. Individual corkscrew-shaped plates can also be fashioned from sheet steel, and then welded in place between the outer wall and the gas collector wall. Regardless, a variety of sizes can be utilized depending on the intended application.

Up-Flow Reactors

The present disclosure also describes up-flow reactors that can incorporate separators as described above. In some examples, the up-flow reactor can be a UASB reactor. However, the separators can be used with any type of reactor that produces a mixture of gas, liquid and solid materials. The reactor can include a reaction chamber that contains a mixture of gas, liquid, and solids. This reaction chamber can be connected to the gas-liquid-solid mixture inlet opening of the separator so that the mixture can flow into the separator. In certain examples, the reaction chamber can be positioned directly below the separator. In this arrangement, the mixture of gas, liquid, and solids can flow upward from the reaction chamber into the separator. Solids that have settled out of the liquid in the separator fall back down into the reaction chamber through the mixture inlet opening.

In some examples, the reaction chamber can contain a process that produces a gaseous product, such as biogas. In further examples, the reaction can consume solids, such as solid contaminants in wastewater. The separators described herein can be particularly useful for use with reactions that produce a product gas and which consume solids.

Figure 9:
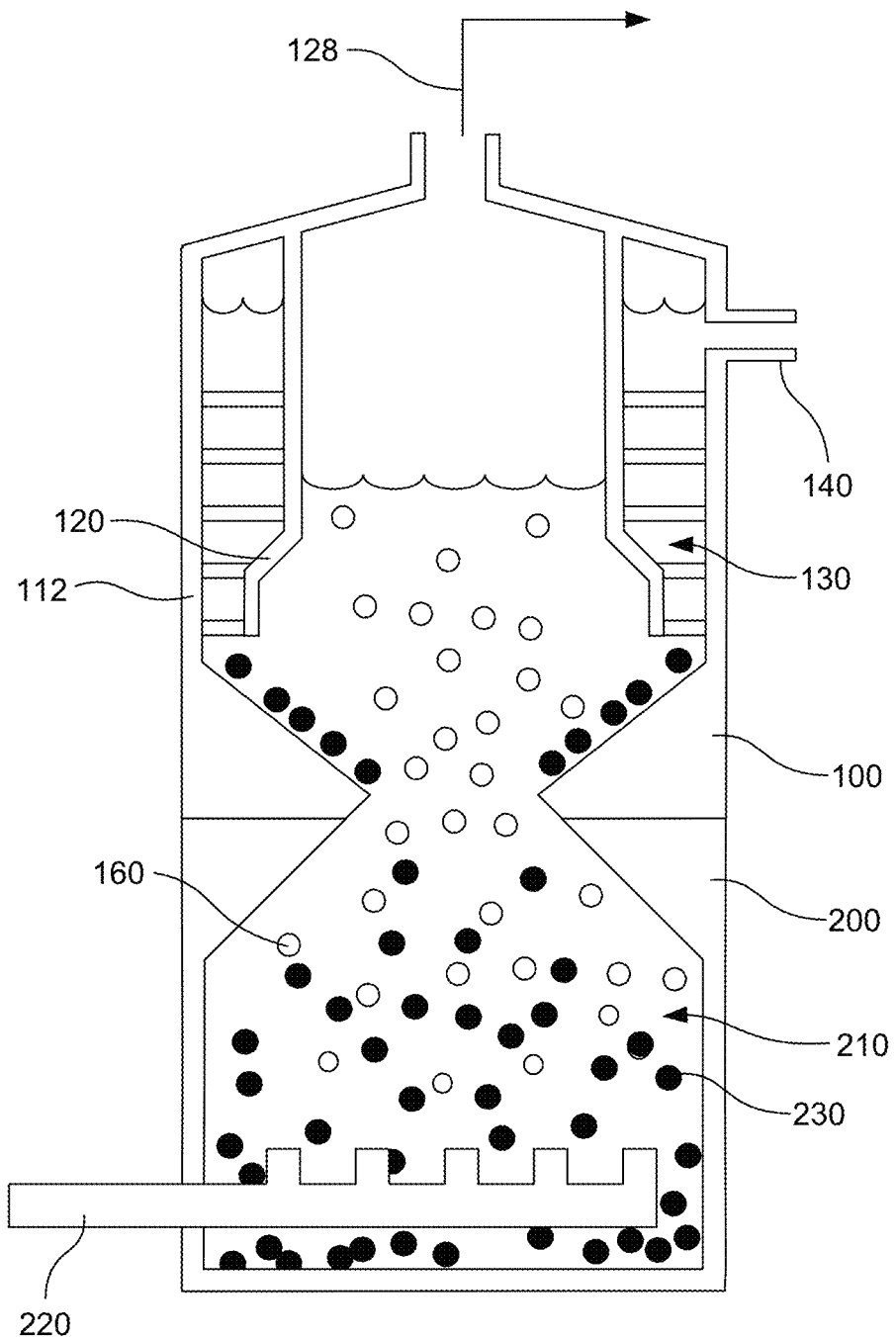
FIG. 9 is a cross-sectional view of an example up-flow reactor in accordance with the present disclosure.

FIG. 9 shows an example reactor 200 with a separator 100. This example is a UASB reactor for treating wastewater. The reactor includes a reaction chamber 210 under the separator. A wastewater inlet pipe 220 is in the reaction chamber, to allow wastewater to flow into the reactor to be treated. Sludge granules 230 are suspended in the wastewater in the reaction chamber. As explained above, the sludge granules include bacteria or other anaerobic microorganisms that decompose contaminants in the wastewater and produce biogas. The biogas forms bubbles 160 that rise into the separator. The wastewater also flows up into separator, carrying some entrained sludge flocs and/or other solid particles. The biogas bubbles are collected by the gas collector 120 in the center of the separator. The biogas exits as a gas stream 128. The water with entrained solids flows up through the inclined flow channels 130 in the annular volume between the gas collector and the outer wall 112 of the separator. As explained above, the solids can settle out of the water in the inclined flow channels. Thus, clarified effluent exits from the inclined flow channels at the top of the separator. The clarified effluent then flows out through an effluent outlet 140.

Methods of Separating Gas, Liquid, and Solids

The present disclosure also describes methods of separating gas, liquid, and solids. The methods can include feeding a mixture of gas, liquid, and solids into a separator through a gas-liquid-solid mixture inlet opening of the separator. The separator can include the features and components described above. The methods can also include collecting gas from the gas collector of the separator. A mixture of liquid and solids can flow up through the plurality of inclined flow channels in the separator. At least a portion of the solids can settle out of the liquid and fall back downward through the inclined flow channels. The method can also include collecting a clarified liquid with reduced solids from an outlet at the top of the inclined flow channels.

In certain examples, the mixture of gas, liquids, and solids can include water, biogas, and sludge particles that include anaerobic bacteria. The method can also include treating the mixture in a reactor, such as a UASB reactor.

The gas collector of the separator can capture all or most of the gas in the gas-liquid-solid mixture. In some examples, the clarified liquid that is recovered from the separator can be devoid of gas or may include a small amount of gas, below the solubility limit.

In some examples, the efficacy of the separator can be influenced by the flow rate of the gas-liquid-solids mixture through the separator. The flow rate may be expressed as a space velocity, which is the number of times a volume of material equal to the internal volume of the separator flows through the separator in a certain period of time. In some examples, the space velocity can be from 0.01 day$^{-1}$ to 10 day$^{-1}$, or from 0.05 day$^{-1}$ to 10 day$^{-1}$, or from 0.1 day$^{-1}$ to 10 day$^{-1}$, or from 0.5 day$^{-1}$ to 10 day$^{-1}$, or from 1 day$^{-1}$ to 10 day$^{-1}$, or from 5 day$^{-1}$ to 10 day$^{-1}$, or from 0.1 day$^{-1}$ to 1 day$^{-1}$, or from 0.5 day$^{-1}$ to 1 day$^{-1}$.

Working Example

A separator was designed using CAD software and fabricated using fused deposition modelling 3D printing. The separator included a gas collector with a flared bottom portion shaped like an upside-down funnel. The flared opening had a sloped surface with an angle of 60° from vertical. The separator had an inclined floor with a slope angle of 45° from horizontal. A plurality of inclined flow channels were formed in the annular volume between the gas collector wall and the outer wall of the separator. The inclined flow channels were formed as corkscrew-shaped plates with an incline angle of 55° measured at the outer wall of the separator. The separator included 23 inclined plates. The separator design was similar to the design shown in FIG. 1.

The separator was installed in a lab-scale reactor that contained wastewater and suspended activated carbon particles. The solids content was about 52 grams per liter. The wastewater flowed from the reactor up into the separator and out through an effluent outlet above the inclined flow channels. Upon visual inspection, the water above the inclined flow channels was significantly clearer than the water below the separator. This demonstrates that the amount of suspended solids in the water was reduced by the separator. Additionally, no biogas escaped through the effluent outlet.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A gas-liquid-solid separator, comprising:
a separator body having a vertical outer wall;
a gas collector having a vertical gas collector wall surrounded by the outer wall, the gas collector further comprising a gas inlet opening at a bottom of the gas collector;
a gas stream outlet exiting the gas collector;
an annular volume between the gas collector wall and the outer wall;
a plurality of inclined flow channels within the annular volume, wherein individual flow channels have a channel inlet opening at a bottom of the individual flow channels, wherein the individual flow channels slope upward following a helical path between the gas collector wall and the outer wall; and
a gas-liquid-solid mixture inlet opening in a floor of the separator body, wherein the mixture inlet opening is in fluid communication with the gas inlet opening of the gas collector and the channel inlet openings of the inclined flow channels, and wherein the mixture inlet opening is positioned below the gas inlet opening, and wherein the mixture inlet opening has a top-down profile that fits within a top-down profile of the gas inlet opening wherein a gas-liquid-solid mixture stream is capable of entering the separator body through the gas-liquid-solid mixture inlet opening, wherein the separator is an integrated part of an up-flow anaerobic sludge blanket reactor.

2. The separator of claim 1, wherein the vertical outer wall and the gas collector wall are cylindrical.

3. The separator of claim 1, wherein the gas inlet opening and the mixture inlet opening are circular.

4. The separator of claim 3, wherein the gas collector further comprises a flared bottom portion that widens from the gas collector wall to the gas inlet opening, such that the gas inlet opening has a larger diameter than the gas collector wall.

5. The separator of claim 4, wherein the flared bottom portion includes an inclined inner surface sloping upward toward a central axis of the gas collector at an angle from about 20° to about 60° from vertical.

6. The separator of claim 1, wherein the inclined flow channels are formed as a plurality of corkscrew-shaped plates extending from the gas collector wall to the outer wall.

7. The separator of claim 1, wherein the inclined flow channels are inclined at an angle from about 35° to about 70° from horizontal when the angle is measured at both outer and inner wall.

8. The separator of claim 1, wherein the floor of the separator body slopes upward from the mixture inlet opening to the outer wall.

9. The separator of claim 1, wherein the separator is formed as a drop-in insert for an up-flow anaerobic sludge blanket reactor.

10. An up-flow reactor, comprising:
a reaction chamber in a lower portion of the reactor; and
a gas-liquid-solid separator positioned above the reaction chamber, wherein the separator comprises:
a separator body having a vertical outer wall;
a gas collector having a vertical gas collector wall surrounded by the outer wall, the gas collector further comprising a gas inlet opening at a bottom of the gas collector;
an annular volume between the gas collector wall and the outer wall;
a plurality of inclined flow channels within the annular volume, wherein individual flow channels have a channel inlet opening at a bottom of the individual flow channels,
wherein the individual flow channels slope upward following a helical path between the gas collector wall and the outer wall; and
a gas-liquid-solid mixture inlet opening in a floor of the separator body to allow a gas-liquid-solid mixture to flow from the reaction chamber into the separator, wherein the mixture inlet opening is in fluid communication with the gas inlet opening of the gas collector and the channel inlets of the inclined flow channels, and wherein the mixture inlet opening is positioned below the gas inlet opening, and wherein the mixture inlet opening has a top-down profile that fits within a top-down profile of the gas inlet opening.

11. The reactor of claim 10, wherein the gas collector further comprises a flared bottom portion that widens from the gas collector wall to the gas inlet opening, such that the gas inlet opening has a larger diameter than the gas collector wall.

12. The reactor of claim 10, wherein the inclined flow channels are formed as a plurality of corkscrew-shaped plates extending from the gas collector wall to the outer wall.

13. The reactor of claim 10, wherein the inclined flow channels are inclined at an angle from about 35° to about 70° from horizontal when the angle is measured at the outer wall.

14. The reactor of claim 10, wherein the floor of the separator body slopes upward from the mixture inlet opening to the outer wall.

15. The reactor of claim 10, further comprising a bottom surface sloping downward out from the mixture inlet opening.

16. The reactor of claim 15, wherein the bottom surface slopes downward at an angle from about 35° to about 70° from horizontal.

17. The reactor of claim 10, further comprising a clarified liquid chamber in the annular volume above the plurality of inclined flow channels, wherein the individual flow channels have a channel outlet opening at a top of the individual flow channels to outlet into the clarified liquid chamber.

18. The reactor of claim 10, further comprising a wastewater inlet in the reaction chamber to introduce water and solid waste into the reaction chamber.

19. A method of separating gas, liquid, and solids, comprising:
feeding a mixture of gas, liquid, and solids into a separator through a gas-liquid-solid mixture inlet opening of the separator, wherein the separator comprises:
a separator body having a vertical outer wall;
a gas collector having a vertical gas collector wall surrounded by the outer wall, the gas collector further comprising a gas inlet opening at a bottom of the gas collector;
an annular volume between the gas collector wall and the outer wall;
a plurality of inclined flow channels within the annular volume, wherein individual flow channels have a channel inlet opening at a bottom of the individual flow channels, wherein the individual flow channels slope upward following a helical path between the gas collector wall and the outer wall; and
the gas-liquid-solid mixture inlet opening in a floor of the separator body, wherein the mixture inlet opening is in fluid communication with the gas inlet opening of the gas collector and the channel inlets of the inclined flow channels, and wherein the mixture inlet opening is positioned below the gas inlet opening, and wherein the mixture inlet opening has a top-down profile that fits within a top-down profile of the gas inlet opening;
collecting gas from the gas collector;
flowing a mixture of liquid and solids up through the plurality of inclined flow channels, wherein at least a portion of the solids settle out of the liquid and fall back downward through the inclined flow channels; and
collecting a clarified liquid with reduced solids from an outlet at the top of the inclined flow channels.

20. The method of claim 19, wherein the mixture of gas, liquids, and solids comprises water, biogas, and sludge particles comprising anaerobic bacteria.

21. A gas-liquid-solid separator, comprising:
a separator body having a vertical outer wall;
a gas collector having a vertical gas collector wall surrounded by the outer wall, the gas collector further comprising a gas inlet opening at a bottom of the gas collector;
an annular volume between the gas collector wall and the outer wall;

a plurality of inclined flow channels within the annular volume, wherein individual flow channels have a channel inlet opening at a bottom of the individual flow channels, wherein the individual flow channels slope upward following a helical path between the gas collector wall and the outer wall;

a gas-liquid-solid mixture inlet opening in a floor of the separator body, wherein the mixture inlet opening is in fluid communication with the gas inlet opening of the gas collector and the channel inlet openings of the inclined flow channels, and wherein the mixture inlet opening is positioned below the gas inlet opening, and wherein the mixture inlet opening has a top-down profile that fits within a top-down profile of the gas inlet opening; and a bottom surface sloping downward out from the gas-liquid-solid mixture inlet opening.

22. The separator of claim 21, wherein the vertical outer wall and the gas collector wall are cylindrical.

23. The separator of claim 21, wherein the gas inlet opening and the mixture inlet opening are circular.

24. The separator of claim 23, wherein the gas collector further comprises a flared bottom portion that widens from the gas collector wall to the gas inlet opening, such that the gas inlet opening has a larger diameter than the gas collector wall.

25. The separator of claim 24, wherein the flared bottom portion includes an inclined inner surface sloping upward toward a central axis of the gas collector at an angle from about 20° to about 60° from vertical.

26. The separator of claim 21, wherein the inclined flow channels are formed as a plurality of corkscrew-shaped plates extending from the gas collector wall to the outer wall.

27. The separator of claim 21, wherein the inclined flow channels are inclined at an angle from about 35° to about 70° from horizontal when the angle is measured at both outer and inner wall.

28. The separator of claim 21, wherein the floor of the separator body slopes upward from the mixture inlet opening to the outer wall.

29. The separator of claim 21, wherein the separator is formed as a drop-in insert for an up-flow anaerobic sludge blanket reactor.

30. The separator of claim 21, wherein the separator is an integrated part of an up-flow anaerobic sludge blanket reactor.

* * * * *